No. 654,697. Patented July 31, 1900.
G. E. WILSON.
GRAPPLE OR TONGS.
(Application filed July 22, 1899.)
(No Model.)
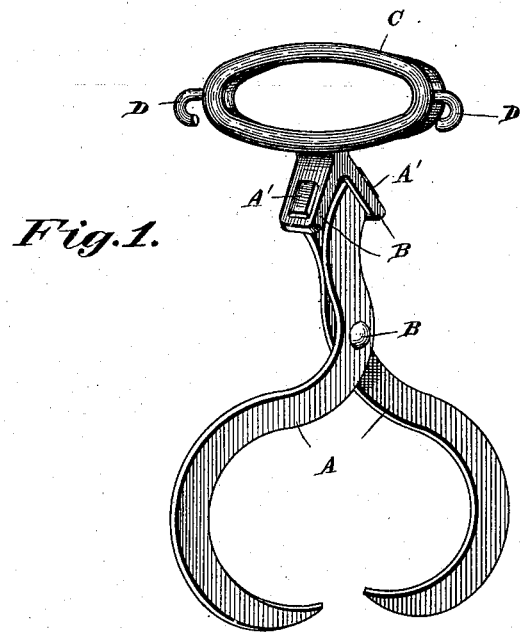
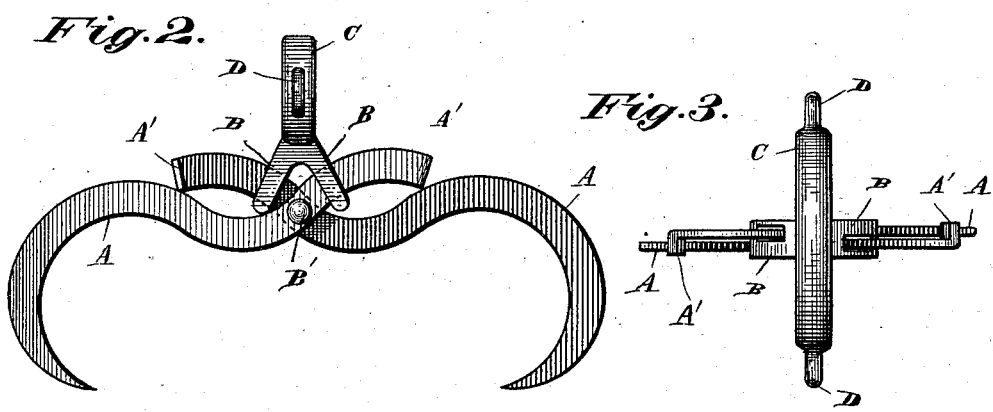
Witnesses  
Inventor  
G. E. Wilson,

UNITED STATES PATENT OFFICE.

GEORGE E. WILSON, OF ST. CLAIRSVILLE, OHIO, ASSIGNOR OF ONE-HALF TO MADISON ALDREDGE, OF SAME PLACE.

GRAPPLE OR TONGS.

SPECIFICATION forming part of Letters Patent No. 654,697, dated July 31, 1900.

Application filed July 22, 1899. Serial No. 724,832. (No model.)

*To all whom it may concern:*

Be it known that I, GEORGE E. WILSON, a citizen of the United States, residing at St. Clairsville, in the county of Belmont and State of Ohio, have invented a new and useful Improvement in Grapples or Tongs, of which the following is a specification.

This invention is a new and useful construction of ice-tongs, the object being to provide a pair of tongs of such construction that a single handle centrally arranged would cause the jaws to grip the object during the lifting operation and by pressing down upon the said handle the jaws will be separated to release the object.

With this object in view the invention consists, essentially, in constructing the legs of the tongs with compound-curved extensions, which extensions pass through depending lugs carried by a handle, which handle is arranged at right angles to the legs, the curved extensions having oppositely-disposed shoulders to limit their movement through the slotted lugs.

The invention also consists in certain details of construction and novelties of combination, all of which will be fully described hereinafter and pointed out in the claim.

In the drawings forming part of this specification, Figure 1 is a perspective view of a pair of tongs constructed in accordance with my invention, the legs being closed in position to hold an object. Fig. 2 is a side elevation, the legs of the tongs being separated to release an object; and Fig. 3 is a top plan view, the parts being in the same position as shown in Fig. 2.

In constructing a pair of tongs in accordance with my invention I form each of the legs A with the ordinary hook at one end and with a reverse curve at the other and a perforation substantially midway of the reverse curve. The tip or extreme end of the outer curve of each leg is bent laterally at an angle, as seen at A', so as to extend over the opposite leg when the legs are pivotally secured together by means of the bolt or pivot B'.

The handle C, by means of which the hooks are manipulated and lifted, is provided with two downwardly-projecting diverging lugs B, each of which is provided with a slot of substantially the same area as the cross-sectional area of the upper ends of the legs. These lugs are preferably arranged at right angles to the loop or open portion of the handle, and the divergence between them is such that when the hooks are being opened or closed the upper curved surface of each leg will not bear against the lug opposite the one through which it is moving, and when the legs are opened as far as they will go, as seen in Fig. 2, the end of each lug will lie between the curved ends of one of the legs and the reversed curve of the hook portion of the other leg, and the bent portion of the end of each leg will rest upon the opposite leg and prevent the further outward movement of the hooked ends of the legs. When it is desired to close the hooks, the handle C is lifted up, which will cause the lugs B to slide upon their respective legs and gradually close the hooks upon the object being grappled. If there be no object between the points of the hooks, the lugs B will slide upon the opposite ends of the leg until the bent portions A' engage with the outer surfaces of the lugs B and stop their further movement, as shown in Fig. 1.

At each end of the handle is a hook D, to which a chain may be attached, if so desired. By having the handle arranged directly over the pivot-bolt and at the same time arranged at right angles to the legs I am enabled to open and close the prongs quicker and easier than the ordinary ice-tongs, inasmuch as it is only necessary to pull upon the handle to bring the tongs together or to press down upon said handle to support them.

Having thus fully described my invention, what I claim as new, and desire to secure by Letters Patent of the United States, is—

In an ice-hook, the combination with a handle provided with two diverging perforated lugs, of two legs through said perforations, one end of each of which legs is formed into a hook and the opposite end is bent into a reverse curve and has its tip bent laterally, and the intermediate portion, substantially midway of the reverse curve, is perforated, and a pivot through said perforations, the curvature of the legs and the divergence of the lugs being such that when the hook is closed the bent portions of the legs will rest against the outer surface of the lugs, and
5 when the hook is open said bent portions will rest upon the curved portions of the opposite legs, and the end of each lug will lie between the curved end of one leg and the reversely-curved portion of the other leg.

GEORGE E. WILSON.

Witnesses:
A. L. McFARLAND,
W. W. COWEN.